United States Patent
Schuler et al.

[11] Patent Number: 5,853,900
[45] Date of Patent: Dec. 29, 1998

[54] ALKENYLNITRILE-CONTAINING BINDERS FOR PAPER COATING SLIPS

[75] Inventors: Bernhard Schuler, Mannheim; Elmar Schwarzenbach, Römerberg; Jürgen Hartmann, Frankenthal; Chung-Ji Tschang, Bad Dürkheim, all of Germany

[73] Assignee: BASF Aktiengesellschaft, Ludwigshafen, Germany

[21] Appl. No.: 835,027

[22] Filed: Mar. 27, 1997

Related U.S. Application Data

[63] Continuation of Ser. No. 563,625, Nov. 28, 1995, abandoned.

[30] Foreign Application Priority Data

Dec. 1, 1994 [DE] Germany ............... 44 42 729.8

[51] Int. Cl.$^6$ ............ D21H 19/58; C08L 51/00; C08F 265/00
[52] U.S. Cl. ............ 428/514; 427/391; 162/135; 524/504; 524/521; 524/560; 524/565; 524/831; 524/425; 524/446; 525/221; 525/228; 525/230; 525/301; 525/308
[58] Field of Search ............ 428/514; 525/221, 525/228, 230, 301, 308; 524/504, 521, 560, 565, 831, 835; 162/135; 427/391

[56] References Cited

U.S. PATENT DOCUMENTS

| | | | |
|---|---|---|---|
| 3,041,307 | 6/1962 | Baer | 525/308 |
| 3,745,196 | 7/1973 | Lane et al. | |
| 3,847,856 | 11/1974 | Mueller et al. | |
| 4,460,742 | 7/1984 | Kishida | 525/228 |

FOREIGN PATENT DOCUMENTS

| | | |
|---|---|---|
| 0 204550 | 12/1986 | European Pat. Off. . |
| 0 426391 | 5/1991 | European Pat. Off. . |
| 0 429207 | 5/1991 | European Pat. Off. . |
| 21 49 282 | 10/1971 | Germany . |
| 2 149282 | 4/1973 | Germany . |
| 1696167 | 8/1974 | Germany . |
| 0 089 086 | 9/1983 | Germany . |
| 130929 | 12/1974 | Japan . |

OTHER PUBLICATIONS

Martens *Technology of Paints, Varnishes and Lacquers* p. 548; 1968.
von Fischer "Paint and Varnish Technology" pp. 315–316; 1948.

*Primary Examiner*—David Buttner
*Attorney, Agent, or Firm*—Oblon, Spivak, McClelland, Maier & Neustadt, P.C.

[57] ABSTRACT

Paper coating slips contain an emulsion copolymer, comprising overall
from 0 to 60% by weight of a vinylaromatic,
from 40 to 95% by weight of a $C_1$–$C_{10}$-alkyl (meth)acrylate,
from 5 to 40% by weight of an alkenylnitrile,
from 0 to 10% by weight of an ethylenically unsaturated acid and
from 0 to 20% by weight of further monomers
as a binder, wherein the emulsion copolymer is a mixture of at least two polymers or an emulsion copolymer comprising at least two stages, one polymer or one stage whose content in the emulsion copolymer is from 10 to 75% by weight containing at least 90% by weight of the total amount of alkenylnitrile (alkenylnitrile-rich polymer or stage).

9 Claims, No Drawings

ALKENYLNITRILE-CONTAINING BINDERS FOR PAPER COATING SLIPS

This application is a continuation of application Ser. No. 08/563,625, filed on Nov. 28, 1995 now abandoned.

The present invention relates to paper coating slips containing an emulsion copolymer, comprising overall
from 0 to 60% by weight of a vinylaromatic,
from 40 to 95% by weight of a $C_1$–$C_{10}$-alkyl (meth)acrylate,
from 5 to 40% by weight of an alkenylnitrile,
from 0 to 10% by weight of an ethylenically unsaturated acid and
from 0 to 20% by weight of further monomers
as a binder, wherein the emulsion copolymer is a mixture of at least two polymers or an emulsion copolymer comprising at least two stages, one polymer or one stage whose content in the emulsion copolymer is from 10 to 75% by weight containing at least 90% by weight of the total amount of alkenylnitrile (alkenylnitrile-rich polymer or stage).

Binders for paper coating slips are used to fix the pigments to one another and to the paper. The binding power should be very high. However, the binders also have a strong effect on the other paper properties, such as gloss, print gloss and printability. The binders are usually emulsion copolymers. On the basis of the monomers used, a distinction is made between styrene/butadiene binders (S/B binders) and styrene/acrylate binders (S/A binders). The properties of the two binders in the paper differ greatly. The molecular structure of the S/B binders differs in a typical way from that of an S/A binder since the conjugated double bond of the butadiene leads to pronounced branching and crosslinking of the polymer chain. The proportion of branched and crosslinked structures is characterized by the gel content: the amount of dried polymer which is insoluble in a solvent. The molecular structure has an important effect on the binding power of the emulsion in the paper coat. For example, in S/B binders, the gel content and hence the binding power can be varied within wide limits by adding a regulator. A disadvantage of the butadiene-containing binders is their tendency to yellow.

S/A binders contain acrylates instead of butadiene. Owing to their monounsaturated character, they cannot undergo branching or crosslinking via double bonds. They therefore have a fundamentally different polymer structure. In contrast to the S/B binders, S/A binders do not yellow and generally impart better printability to the paper coat.

In the printing process in an offset printing press, strong tensile forces act on the paper coat owing to the high viscosity of the printing ink. The resistance offered to these forces by the paper coat is referred to as the picking resistance. A distinction is made between dry picking resistance and wet picking resistance. The wet picking resistance is important in particular in water-based offset printing since the printing ink comes into contact with a water-moist paper in the second printing unit, and the paper coat must have sufficient binding power under these conditions.

EP-A-204 550 discloses styrene/butadiene binders and their use in paper coating slips. The binders have a core-shell morphology and contain acrylonitrile in the shell.

EP-A-429 207 discloses emulsion copolymers which are composed of different stages and contain acrylonitrile in the 1st stage. Paper coating slips are not mentioned.

DE-A-2 149 282 and EP-426 391 disclose styrene/acrylate binders which may also contain, inter alia, acrylonitrile, and their use in paper coating slips.

It is an object of the present invention to provide binders based on acrylates, which, when used in paper coating slips, ensure improved wet picking resistance and otherwise good dry picking resistance, good gloss, print gloss and good printability.

We have found that this object is achieved by the paper coating slips defined above. We have also found a process for the production of papers coated with paper coating slips and the use of the papers thus obtainable for offset printing.

The novel paper coating slips contain an emulsion copolymer which comprises overall
from 0 to 60, preferably from 0 to 45, particularly preferably from 10 to 45, % by weight of at least one vinylaromatic,
from 40 to 95, preferably from 40 to 90, particularly preferably
from 40 to 79, % by weight of at least one $C_1$–$C_{10}$-alkyl (meth)acrylate,
from 5 to 40, preferably from 10 to 30, % by weight of at least one alkenylnitrile,
from 0 to 10, preferably from 0 to 5, particularly preferably from 0.5 to 5, % by weight of an ethylenically unsaturated acid and
from 0 to 20, preferably from 0 to 10, % by weight of further monomers.

The stated weights are each based on the total emulsion copolymer.

Examples of vinylaromatics are α-methylstyrene, p-methylstyrene and preferably styrene.

Preferred $C_1$–$C_{10}$-alkyl (meth)acrylates are $C_1$–$C_{10}$-alkyl acrylates and $C_4$–$C_{10}$-alkyl methacrylates. Alkyl acrylates are particularly preferred. For example, n-butyl acrylate and 2-ethylhexyl acrylate are very particularly preferred.

Preferred alkenylnitriles are acrylonitrile and methacrylonitrile.

Preferred ethylenically unsaturated acids are carboxylic acids and dicarboxylic acids, eg. maleic acid, fumaric acid, itaconic acid and preferably (meth)acrylic acid.

The further monomers may be, for example, $C_1$–$C_{16}$-hydroxyalkyl (meth)acrylates, vinyl ethers, vinyl esters, such as vinyl acetate, and ethylenically unsaturated amides or anhydrides, eg. (meth)acrylamide or maleic anhydride.

Conjugated aliphatic dienes are present as further monomers preferably only in amounts of from 0 to 5% by weight. The emulsion copolymer particularly preferably contains no conjugated aliphatic dienes, eg. butadiene or isoprene.

The emulsion copolymer comprises at least two, preferably two, stages or the emulsion copolymer is a mixture of at least two, preferably two, polymers.

One stage or one polymer is in this case rich in alkenylnitrile. The amount of the alkenylnitrile-rich stage or of the alkenyl-nitrile-rich polymer is from 75 to 10, preferably from 60 to 25, particularly preferably from 60 to 40, % by weight, based on the emulsion copolymer.

The alkenylnitrile-rich stage or the alkenylnitrile-rich polymer contains at least 90, preferably at least 95, very particularly preferably 100, % by weight of the total amount of alkenylnitrile.

An emulsion copolymer composed of different stages is preferred to a mixture of polymers. The final, ie. the outer, stage (shell) is preferably the alkenylnitrile-rich stage.

The glass transition temperature of the total emulsion copolymer, taking into account all monomers of the individual stages or components of the mixture, is preferably from −40° to 60° C., particularly preferably from −20° to 40° C., the glass transition temperature being calculated according to T. G. Fox, Bull. Am. Phys. Soc. (Ser. II) 1 (1956) 123.

The emulsion copolymer is prepared in particular by emulsion polymerization, preferably at from 30° to 95° C., in the presence of a water-soluble initiator and of an emulsifier.

Suitable initiators are, for example, sodium persulfate, potassium persulfate, ammonium persulfate, tert-butyl hydroperoxides, water-soluble azo compounds and redox initiators.

The emulsifiers used are, for example, alkali metal salts of relatively long-chain fatty acids, alkylsulfates, alkylsulfonates, alkylated arylsulfonates or alkylated bisphenyl ether sulfonates. Other suitable emulsifiers are reaction products of alkylene oxides, in particular ethylene oxide or propylene oxide, with fatty alcohols, fatty acids or phenol or alkylphenols.

In the case of the mixtures, the individual polymers can be prepared separately from one another, in particular by emulsion polymerization, and then mixed in the form of their aqueous emulsions.

In the case of the emulsion copolymer composed of different stages, the monomers of each subsequent stage are polymerized in the presence of the stage already prepared.

In the case of the polymerization in the individual stages, the particular monomer mixtures of the individual stages can be initially taken or added all at once; however, the monomers can also be added by the feed method in the individual stages, if required some of the monomers being initially taken.

The polymerization of the monomer mixture of a stage is started only when the residual monomer content in the polymerization of the preceding stage is preferably less than 10, particularly preferably less than 5, very particularly preferably less than 1, % by weight, based on the monomer mixture of the preceding stage.

The solids content of the aqueous emulsion of the emulsion copolymer is preferably from 20 to 70% by weight. The size of the latex particles is preferably from 80 to 350 nm, particularly preferably from 80 to 250 nm, very particularly preferably from 80 to 200 nm (weight average particle diameter, determined by means of the ultracentrifuge).

The novel paper coating slips contain the claimed emulsion copolymers in amounts of preferably from 1 to 20, particularly preferably from 5 to 15% by weight, based on the pigment content of the paper coating slips.

Pigments are usually the main component of the paper coating slips. Frequently used pigments are, for example, barium sulfate, calcium carbonate, calcium sulfoaluminate, kaolin, talc, titanium dioxide, zinc oxide, chalk and coating clay.

The paper coating slips may also contain conventional dispersants. Suitable dispersants are polyanions, for example of polyphosphoric acids or of polyacrylic acid (polysalts), which are usually present in amounts of from 0.1 to 3% by weight, based on the amount of pigment.

The paper coating slips may furthermore contain cobinders. Examples of natural cobinders are starch, casein, gelatine and alginates, and examples of modified natural products are hydroxyethylcellulose, methylcellulose and carboxymethylcellulose as well as cationically modified starch. However, conventional synthetic cobinders, for example those based on vinyl acetate or acrylate, may also be used.

These may be present in amounts of, for example, from 0.1 to 10% by weight, based on the amount of pigment.

The paper coating slips may be applied by a conventional method to the papers to be coated (cf. Ullmann's Encyklopädie der Technischen Chemie, 4th Edition, Vol. 17, page 603 et seq.).

The papers coated in this manner have good printability in the subsequent offset printing process, ie. in contact with a printing ink/water system. In particular, the wet picking resistance is substantially improved.

EXAMPLES

PREPARATION OF THE BINDERS

Comparative Example 1 (homogeneous distribution of the acrylonitrile)

Initially taken mixture:
  9.3 g of sodium laurylsulfate (15% strength in water)
  2.2 g of sodium $C_{12}$-alkyldiphenyl ether disulfate (45% strength in water)
  76.9 g of Feed 1
  7.3 g of Feed 2
  298.0 g of demineralized water Feed 1:
  10.7 g of sodium laurylsulfate (15% strength in water)
  11.1 g of sodium $C_{12}$-alkyldiphenyl ether disulfate (45% strength in water)
  66.7 g of sodium pyrophosphate (3% strength in water)
  700.0 g of n-butyl acrylate
  130.0 g of styrene
  150.0 g of acrylonitrile,
  20.0 g of acrylic acid
  450.0 g of demineralized water Feed 2:
  5.0 g of sodium peroxodisulfate
  140.0 g of demineralized water Feed 3:
  2.0 g of diammonium iron(II) sulfate (1% strength in water)

Feed 4:
  20.0 g of tert-butyl hydroperoxide (10% strength in water)

Feed 5
  20.0 g of sodium hydroxymethylsulfinate (10% strength in water)

Feed 6:
  9.2 g of ammonia (25% strength in water)

The initially taken mixture was heated to 85° C. under nitrogen without the portion of Feed 2. At 85° C., the portion of Feed 2 was added and polymerization was carried out for 15 minutes. Thereafter, at 85° C. and while stirring, the remainder of Feed 1 was added in the course of 2 hours and, beginning simultaneously with Feed 1, the remainder of Feed 2 was added in the course of 2.5 hours. The reaction mixture was then stirred for a further hour at 85° C. Feeds 3 and 4 were added, and Feed 5 was metered in over 1 hour while cooling to 60° C. Stirring was continued for 30 minutes, the mixture was cooled to 25° C. and Feed 6 was added. An emulsion having a solids content of 49.5% and a pH of 6.8 was obtained. Particle size: 135 nm.

Example 1 (acrylonitrile only in the 2nd stage of the polymer)

Initially taken mixture:
  9.3 g of sodium laurylsulfate (15% strength in water)
  2.2 g of sodium $C_{12}$-alkyldiphenyl ether disulfate (45% strength in water)
  76.9 g of Feed 1
  7.3 g of Feed 2
  298.0 g of demineralized water Feed 1:
  10.7 g of sodium laurylsulfate (15% strength in water)
  11.1 g of sodium $C_{12}$-alkyldiphenyl ether disulfate (45% strength in water)

66.7 g of sodium pyrophosphate (3% strength in water)

700.0 g of n-butyl acrylate 130.0 g of styrene 20.0 g of acrylic acid 450.0 g of demineralized water Feed 2:

5.0 g of sodium peroxodisulfate 140.0 g of demineralized water

Feed 3:

150.0 g of acrylonitrile

Feed 4:

2.0 g of diammonium iron(II) sulfate (1% strength in water)

Feed 5:

20.0 g of tert-butyl hydroperoxide (10% strength in water)

Feed 6:

20.0 g of sodium hydroxymethylsulfinate (10% strength in water)

Feed 7:

9.2 g of ammonia (25% strength in water)

The initially taken mixture was heated to 85° C. under nitrogen without the portion of Feed 2. At 85° C., the portion of Feed 2 was added and polymerization was carried out for 15 minutes. Thereafter, at 85° C. and while stirring, the remainder of Feed 1 was added in the course of 2 hours and, beginning simultaneously with Feed 1, the remainder of Feed 2 was added in the course of 2.5 hours. One hour after the start of Feeds 1 and 2, Feed 3 was metered in over 1 hour. The reaction mixture was then stirred for a further hour at 85° C. Feeds 4 and 5 were added, and Feed 6 was metered in over one hour while cooling to 60° C. Stirring was continued for 30 minutes, the mixture was cooled to 25° C. and Feed 7 was added. An emulsion having a solids content of 49.1% and a pH of 6.9 was obtained. Particle size: 139 nm.

Example 2 (polymer without acrylonitrile for mixing)

Initially taken mixture:

9.3 g of sodium laurylsulfate (15% strength in water)

2.2 g of sodium $C_{12}$-alkyldiphenyl ether disulfate (45% strength in water)

76.9 g of Feed 1

7.3 g of Feed 2

298.0 g of demineralized water

Feed 1:

10.7 g of sodium laurylsulfate (15% strength in water)

11.1 g of sodium $C_{12}$-alkyldiphenyl ether disulfate (45% strength in water)

66.7 g of sodium pyrophosphate (3% strength in water)

823.5 g of n-butyl acrylate 153.0 g of styrene 23.5 g of acrylic acid 450.0 g of demineralized water Feed 2:

5.0 g of sodium peroxodisulfate 140.0 g of demineralized water

Feed 3:

2.0 g of diammonium iron(II) sulfate (1% strength in water)

Feed 4:

20.0 g of tert-butyl hydroperoxide (10% strength in water)

Feed 5:

20.0 g of sodium hydroxymethylsulfinate (10% strength in water)

Feed 6:

9.2 g of ammonia (25% strength in water)

The initially taken mixture was heated to 85° C. under nitrogen without the portion of Feed 2. At 85° C., the portion of Feed 2 was added and polymerization was carried out for 15 minutes. Thereafter, at 85° C. and while stirring, the remainder of Feed 1 was added in the course of 2 hours and, beginning simultaneously with Feed 1, the remainder of Feed 2 was added in the course of 2.5 hours. The reaction mixture was then stirred for a further hour at 85° C. Feeds 3 and 4 were added, and Feed 5 was metered in over 1 hour while cooling to 60°C. Stirring was continued for 30 minutes, the mixture was cooled to 25° C. and Feed 6 was added. An emulsion having a solids content of 49.6% and a pH of 5.9 was obtained. Particle size: 132 nm.

Example 3 (polymer with acrylonitrile for mixing)

Initially taken mixture:

9.3 g of sodium laurylsulfate (15% strength in water)

2.2 g of sodium $C_{12}$-alkyldiphenyl ether disulfate (45% strength in water)

76.9 g of Feed 1

7.3 g of Feed 2

298.0 g of demineralized water

Feed 1:

10.7 g of sodium laurylsulfate (15% strength in water)

11.1 g of sodium $C_{12}$-alkyldiphenyl ether disulfate (45% strength in water)

66.7 g of sodium pyrophosphate (3% strength in water)

608.7 g of n-butyl acrylate 113.0 g of styrene 260.9 g of acrylonitrile 17.4 g of acrylic acid 450.0 g of demineralized water Feed 2:

5.0 g of sodium peroxodisulfate 140.0 g of demineralized water

Feed 3:

2.0 g of diammonium iron(II) sulfate (1% strength in water)

Feed 4:

20.0 g of tert-butyl hydroperoxide (10% strength in water)

Feed 5:

20.0 g of sodium hydroxymethylsulfinate (10% strength in water)

Feed 6:

9.2 g of ammonia (25% strength in water)

The initially taken mixture was heated to 85° C. under nitrogen without the portion of Feed 2. At 85° C., the portion of Feed 2 was added and polymerization was carried out for 15 minutes. Thereafter, at 85 ° C. and while stirring, the remainder of Feed 1 was added in the course of 2 hours and, beginning simultaneously with Feed 1, the remainder of Feed 2 was added in the course of 2.5 hours. The reaction mixture was then stirred for a further hour at 85° C. Feeds 3 and 4 were added, and Feed 5 was metered in over 1 hour while cooling to 60° C. Stirring was continued for 30 minutes, the mixture was cooled to 25° C. and Feed 6 was added. An emulsion having a solids content of 49.3% and a pH of 7.4 was obtained. Particle size: 136 nm.

Comparative Example 2 (homogeneous distribution
of the acrylonitrile)

Initially taken mixture:

9.3 g of sodium laurylsulfate (15% strength in water)

2.2 g of sodium $C_{12}$-alkyldiphenyl ether disulfate (45% strength in water)

76.9 g of Feed 1

7.3 g of Feed 2

298.0 g of demineralized water

Feed 1:

10.7 g of sodium laurylsulfate (15% strength in water)

11.1 g of sodium $C_{12}$-alkyldiphenyl ether disulfate (45% strength in water)

66.7 g of sodium pyrophosphate (3% strength in water)

600.0 g of n-butyl acrylate 200.0 g of styrene 180.0 g of acrylonitrile 20.0 g of acrylic acid 450.0 g of demineralized water Feed 2:

5.0 g of sodium peroxodisulfate 140.0 g of demineralized water

Feed 3:

2.0 g of diammonium iron(II) sulfate (1% strength in water)

Feed 4:

20.0 g of tert-butyl hydroperoxide (10% strength in water)

Feed 5:

20.0 g of sodium hydroxymethylsulfinate (10% strength in water)

Feed 6:

9.2 g of ammonia (25% strength in water)

The initially taken mixture was heated to 85° C. under nitrogen without the portion of Feed 2. At 85° C., the portion of Feed 2 was added and polymerization was carried out for 15 minutes. Thereafter, at 85° C. and while stirring, the remainder of Feed 1 was added in the course of 2 hours and, beginning simultaneously with Feed 1, the remainder of Feed 2 was added in the course of 2.5 hours. The reaction mixture was then stirred for a further hour at 85 C. Feeds 3 and 4 were added, and Feed 5 was metered in over 1 hour while cooling to 60 ° C. Stirring was continued for 30 minutes, the mixture was cooled to 25° C. and Feed 6 was added. An emulsion having a solids content of 49.6% and a pH of 6.8 was obtained. Particle size: 149 nm.

Example 4 (acrylonitrile only in 2nd stage of the polymer)

Initially taken mixture:

9.3 g of sodium laurylsulfate (15% strength in water)

2.2 g of sodium $C_{12}$-alkyldiphenyl ether disulfate (45% strength in water)

76.9 g of Feed 1

7.3 g of Feed 2

298.0 g of demineralized water

Feed 1:

10.7 g of sodium laurylsulfate (15% strength in water)

11.1 g of sodium $C_{12}$-alkyldiphenyl ether disulfate (45% strength in water)

66.7 g of sodium pyrophosphate (3% strength in water)

600.0 g of n-butyl acrylate 200.0 g of styrene 20.0 g of acrylic acid 450.0 g of demineralized water Feed 2:

5.0 g of sodium peroxodisulfate 140.0 g of demineralized water

Feed 3:

180.0 g of acrylonitrile

Feed 4:

2.0 g of diammonium iron(II) sulfate (1% strength in water)

Feed 5:

20.0 g of tert-butyl hydroperoxide (10% strength in water)

Feed 6:

20.0 g of sodium hydroxymethylsulfinate (10% strength in water)

Feed 7:

9.2 g of ammonia (25% strength in water)

The initially taken mixture was heated to 85° C. under nitrogen without the portion of Feed 2. At 85° C., the portion of Feed 2 was added and polymerization was carried out for 15 minutes. Thereafter, at 85° C. and while stirring, the remainder of Feed 1 was added in the course of 2 hours and, beginning simultaneously with Feed 1, the remainder of Feed 2 was added in the course of 2.5 hours. One hour after the start of Feeds 1 and 2, Feed 3 was metered in over one hour. The reaction mixture was then stirred for a further hour at 85 ° C. Feeds 4 and 5 were added, and Feed 6 was metered in over 1 hour while cooling to 60° C. Stirring was continued for 30 minutes, the mixture was cooled to 25° C. and Feed 7 was added. An emulsion having a solids content of 49.3% and a pH of 6.8 was obtained. Particle size: 145 nm.

Example 5 (polymer without acrylonitrile for mixing)

Initially taken mixture:

9.3 g of sodium laurylsulfate (15% strength in water)

2.2 g of sodium $C_{12}$-alkyldiphenyl ether disulfate (45% strength in water)

76.9 g of Feed 1

7.3 g of Feed 2

298.0 g of demineralized water

Feed 1:

10.7 g of sodium laurylsulfate (15% strength in water)

11.1 g of sodium $C_{12}$-alkyldiphenyl ether disulfate (45% strength in water)

66.7 g of sodium pyrophosphate (3% strength in water)

731.7 g of n-butyl acrylate 243.9 g of styrene 24.4 g of acrylic acid 450.0 g of demineralized water Feed 2:

5.0 g of sodium peroxodisulfate 140.0 g of demineralized water

Feed 3:

2.0 g of diammonium iron(II) sulfate (1% strength in water)

Feed 4:

20.0 g of tert-butyl hydroperoxide (10% strength in water)

Feed 5:

20.0 g of sodium hydroxymethylsulfinate (10% strength in water)

Feed 6:

9.2 g of ammonia (25% strength in water)

The initially taken mixture was heated to 85° C. under nitrogen without the portion of Feed 2. At 85° C., the portion of Feed 2 was added and polymerization was carried out for 15 minutes. Thereafter, at 85° C. and while stirring, the remainder of Feed 1 was added in the course of 2 hours and, beginning simultaneously with Feed 1, the remainder of Feed 2 was added in the course of 2.5 hours. The reaction mixture was then stirred for a further hour at 85° C. Feeds 3 and 4 were added, and Feed 5 was metered in over 1 hour while cooling to 60° C. Stirring was continued for 30 minutes, the mixture was cooled to 25° C. and Feed 6 was added. An emulsion having a solids content of 49.6% and a pH of 6.0 was obtained. Particle size: 133 nm.

Example 6 (polymer with acrylonitrile for mixing)
Initially taken mixture:
- 9.3 g of sodium laurylsulfate (15% strength in water)
- 2.2 g of sodium $C_{12}$-alkyldiphenyl ether disulfate (45% strength in water)
- 76.9 g of Feed 1
- 7.3 g of Feed 2
- 298.0 g of demineralized water Feed 1:
- 10.7 g of sodium laurylsulfate (15% strength in water)
- 11.1 g of sodium $C_{12}$-alkyldiphenyl ether disulfate (45% strength in water)
- 66.7 g of sodium pyrophosphate (3% strength in water)
- 508.5 g of n-butyl acrylate
- 169.5 g of styrene
- 305.1 g of acrylonitrile
- 16.9 g of acrylic acid
- 450.0 g of demineralized water Feed 2:
- 5.0 g of sodium peroxodisulfate
- 140.0 g of demineralized water Feed 3:
- 2.0 g of diammonium iron(II) sulfate (1% strength in water)

Feed 4:
- 20.0 g of tert-butyl hydroperoxide (10% strength in water)

Feed 5:
- 20.0 g of sodium hydroxymethylsulfinate (10% strength in water)

Feed 6:
- 9.2 g of ammonia (25% strength in water)

The initially taken mixture was heated to 85° C. under nitrogen without the portion of Feed 2. At 85° C., the portion of Feed 2 was added and polymerization was carried out for 15 minutes. Thereafter, at 85° C. and while stirring, the remainder of Feed 1 was added in the course of 2 hours and, beginning simultaneously with Feed 1, the remainder of Feed 2 was added in the course of 2.5 hours. The reaction mixture was then stirred for a further hour at 85 ° C. Feeds 3 and 4 were added, and Feed 5 was metered in over 1 hour while cooling to 60° C. Stirring was continued for 30 minutes, the mixture was cooled to 25° C. and Feed 6 was added. An emulsion having a solids content of 49.5% and a pH of 7.5 was obtained. Particle size: 138 nm.

Preparation of the paper coating slips

The binders of Examples 1 and 4, mixtures of Examples 2 and 3 or 5 and 6 and binders of Comparative Examples 1 and 2 were used in a paper coating slip having the following composition:
- 70.0 parts by weight of finely divided chalk
- 30.0 parts by weight of finely divided clay
- 0.5 part by weight of carboxymethylcellulose
- 0.4 part by weight of a sodium salt of a polyacrylic acid having a molecular weight of 4000 (polysalt S BASF)
- 0.05 part by weight of sodium hydroxide
- 12.0 parts by weight of binder (solid) from the examples.

The solids content was brought to 65% by weight with water (pH 8.5–9.0).

Testing of the performance characteristics

The base paper used was a wood-free coating paper having a basis weight of 70 g/m$^2$. The paper coating slip was applied on one side in an amount of 10 g/m$^2$ on a laboratory coating apparatus by the blade metering method. Drying was carried out using an IR lamp. Before testing of the performance characteristics, the paper is passed four times through a laboratory calender (one pair of rolls, nip pressure: 2000 N/cm).

Dry picking resistance

Strips measuring 33×3 cm were cut in the longitudinal direction from the papers to be tested, and these strips were stored for 15 hours at 27° C. and 50% relative humidity in a climatic chamber.

The strips were then printed in a printing unit (IGT printability tester AC2/AIC2) with a standard ink (printing ink 3808 from Lorilleux-Lefranc).

The test strips were passed through the printing unit with a continuously increasing speed (maximum speed 200 cm/sec). The speed in cm/sec at which 10 picks from the paper coating slip (picking points) occur after the start of printing is stated as a measure of the dry picking resistance.

Wet picking resistance

The test strips were produced and prepared as described above.

The printing unit (IGT printability tester AC2/AIC2) was set up in such a way that the test strips were moistened with water before the printing process.

Printing was carried out at a constant speed of 0.6 cm/s.

Picks from the paper coating slip or from the paper were visible as unprinted areas. In order to determine the wet picking resistance, the ink density was therefore determined as a % of the solid hue using a color densitometer.

Paper gloss

The gloss of the unprinted test papers was determined at an angle of 45° using a gloss meter (Lehmann LGDL-05). The result was stated in %, based on the incident light intensity.

Print gloss

The print gloss was determined on printed test papers as described above, at an angle of 75°.

The results are shown in the table below.

| Binder of | Dry picking resistance cm/s | Wet picking resistance % | Print gloss % | Paper gloss % |
|---|---|---|---|---|
| I Comparative Example 1 | 60 | 16.3 | 29.7 | 43.6 |
| II Example 1 | 61 | 38.2 | 28.3 | 43.8 |
| III Examples 2/3 (42.5/57.5% by weight)* | 63 | 32.1 | 30.9 | 43.8 |
| IV Comparative Example 2 | 72 | 29.6 | 27.6 | 42.0 |
| V Example 4 | 62 | 40.6 | 25.5 | 41.6 |
| VI Example 5/6 (41.0/59.0% by weight)* | 67 | 37.6 | 28.7 | 41.5 |

*% by weight of the binders (solid)

Note:

The overall polymer compositions and the acrylonitrile contents in I to III and IV to VI are identical.

We claim:

1. A paper coated with a dried coating of an aqueous coating slip composition containing pigments and an emulsion copolymer as binder for said pigments, said copolymer comprising from 0 to 6% by weight of vinyl aromatic, from 40 to 95% by weight of a $C_1$–$C_{10}$-alkyl(meth)acrylate, from 5 to 40% by weight of an alkenylnitrile, from 0 to 10% by weight of an ethylenically unsaturated acid and from 0 to 20% by weight of further monomers;

said binder comprising an emulsion copolymer prepared in at least two stages; at least one of said stages being the outer stage and comprising from 10 to 75% by weight of the polymer content of said binder said at least one outer stage containing at least 90% by weight of the total amount of the alkenylnitrile monomer contained in the monomer composition of said binder; said slip composition containing the claimed emulsion copolymer in an amount of from 1 to 20% by weight, based on the pigment content of the paper coating slip composition.

2. A paper coated with a dried coating of the aqueous coating slip as set forth in claim 1, wherein the emulsion copolymer is present in an amount of from 5 to 15% by weight, based on the pigment content of the paper coating slip composition.

3. A paper coated with a dried coating of the aqueous coating slip as set forth in claim 1, which further contains a cobinder selected from the group consisting of natural cobinders, modified natural products and synthetic cobinders.

4. A paper coated with a dried coating of the aqueous coating slip as set forth in claim 1, wherein said $C_1$–$C_{10}$-alkyl(meth)acrylate is n-butyl acrylate.

5. A coated paper as set forth in claim 1, said paper being suitable for use in an offset printing process.

6. A paper coated with a dried coating of an aqueous coating slip composition containing pigments selected from the group consisting of barium sulfate, calcium carbonate, calcium sulfoaluminate, kaolin, talc, titanium dioxide, zinc oxide, chalk and coating clay, and an emulsion copolymer as binder for said pigments, said copolymer being unable to undergo crosslinking via double bonds and comprising from 0 to 6% by weight of vinylaromatic, from 40 to 95% by weight of a $C_1$–$C_{10}$-alkyl (meth)acrylate, from 5 to 40% by weight of an alkenylnitrile, from 0 to 10% by weight of an ethylenically unsaturated acid and from 0 to 20% by weight of further monomers;

said binder comprising an emulsion copolymer prepared in at least two stages; at least one of said two stages being the outer stage and comprising from 10% to 75% by weight of the polymer content of said binder, said at least one outer stage containing at least 90% by weight of the total amount of the alkenylnitrile monomer contained in the monomer composition of said binder.

7. A paper coated with a dried coating of the aqueous coating slip as set forth in claim 6, wherein the solids content of the aqueous emulsion is from 20 to 70% by weight and the size of the latex particles is from 80 to 350 nm.

8. A coated paper as set forth in claim 7, said paper being suitable for use in an offset printing process.

9. A process for the production of a paper coated with a dried paper coating slip as set forth in claim 6, comprising mixing the aqueous emulsion of the copolymer with the pigments to form a paper coating slip, applying the paper coating slip to paper and drying the paper coating slip.

* * * * *

UNITED STATES PATENT AND TRADEMARK OFFICE
CERTIFICATE OF CORRECTION

PATENT NO. : 5,853,900

DATED : December 29, 1998

INVENTOR(S): Bernhard SCHULER, ET AL.

It is certified that an error appears in the above-identified patent and that said Letters Patent is hereby corrected as shown below:

Column 6, line 34, "40 66.7 g" should read --66.7 g--.

Signed and Sealed this

Seventeenth Day of April, 2001

Attest:

NICHOLAS P. GODICI

Attesting Officer     Acting Director of the United States Patent and Trademark Office